(12) United States Patent
Sankaranarayanan et al.

(10) Patent No.: US 11,710,038 B2
(45) Date of Patent: Jul. 25, 2023

(54) SYSTEMS AND METHODS FOR ACTIVE LEARNING FROM SPARSE TRAINING DATA

(71) Applicant: UCHICAGO ARGONNE, LLC, Chicago, IL (US)

(72) Inventors: Subramanian Sankaranarayanan, Naperville, IL (US); Troy David Loeffler, Chicago, IL (US); Henry Chan, Schaumburg, IL (US)

(73) Assignee: UChicago Argonne, LLC, Chicago, IL (US)

( * ) Notice: Subject to any disclaimer, the term of this patent is extended or adjusted under 35 U.S.C. 154(b) by 454 days.

(21) Appl. No.: 16/847,098

(22) Filed: Apr. 13, 2020

(65) Prior Publication Data
US 2021/0319308 A1    Oct. 14, 2021

(51) Int. Cl.
G06N 3/08     (2023.01)
G06N 3/04     (2023.01)

(52) U.S. Cl.
CPC ............... G06N 3/08 (2013.01); G06N 3/04 (2013.01)

(58) Field of Classification Search
CPC .................................. G06N 3/08; G06N 3/04
USPC ............................................... 706/25, 2
See application file for complete search history.

(56) References Cited

U.S. PATENT DOCUMENTS 6,128,609 A * 10/2000 Rose .................. G06N 3/08
                                                  706/23
6,882,739 B2    4/2005 Kurtz et al.
7,672,815 B2    3/2010 Asgari et al.
7,680,557 B2    3/2010 Kim et al.
8,117,141 B1    2/2012 Srinivasa et al.
(Continued)

FOREIGN PATENT DOCUMENTS

CN    107563574 A  *  1/2018
CN    108280207 A  *  7/2018  ......... G06K 9/00892
(Continued)

OTHER PUBLICATIONS

Abascal & Vega, "A general purpose model for the condensed phases of water: TIP4P/2005," Journal of Chemical Physics 123(23), 234505, 12 pages (2005).
(Continued)

Primary Examiner — Phuong Thao Cao
(74) Attorney, Agent, or Firm — Foley & Lardner LLP

(57) ABSTRACT

A method for active learning using sparse training data can include training a machine learning model using less than ten first training data points to generate a candidate machine learning model. The method can include performing a Monte Carlo process to sample one or more first outputs of the candidate machine learning model. The method can include testing the one or more first outputs to determine if each of the one or more first outputs satisfy a respective convergence condition. The method can include, responsive to at least one first output not satisfying the respective convergence condition, training the candidate machine learning model using at least one second training data point corresponding to the at least one first output. The method can include, responsive to the one or more first outputs each satisfying the respective convergence condition, outputting the candidate machine learning model.

16 Claims, 3 Drawing Sheets

(56) References Cited

U.S. PATENT DOCUMENTS

| | | | |
|---|---|---|---|
| 8,219,511 B2* | 7/2012 | Yang | G06N 20/00 |
| | | | 706/45 |
| 8,835,895 B2 | 9/2014 | Sumino et al. | |
| 8,871,670 B2 | 10/2014 | Seebauer | |
| 8,932,347 B2 | 1/2015 | Choubey et al. | |
| 9,175,174 B2 | 11/2015 | Kambe | |
| 9,525,032 B2 | 12/2016 | Slack et al. | |
| 9,683,682 B2 | 6/2017 | Narayanan et al. | |
| 9,727,824 B2 | 8/2017 | Rose et al. | |
| 9,731,371 B2 | 8/2017 | Enyedy et al. | |
| 9,823,737 B2 | 11/2017 | Mazed et al. | |
| 9,833,862 B2 | 12/2017 | Denney et al. | |
| 9,839,978 B2 | 12/2017 | Narayanan et al. | |
| 9,914,765 B2 | 3/2018 | Timmer et al. | |
| 9,937,580 B2 | 4/2018 | Peters et al. | |
| 10,023,795 B2 | 7/2018 | Ning | |
| 10,046,419 B2 | 8/2018 | Denney et al. | |
| 10,052,706 B2 | 8/2018 | Henry et al. | |
| 10,052,707 B2 | 8/2018 | Henry et al. | |
| 10,068,973 B2 | 9/2018 | Slack et al. | |
| 10,087,079 B2 | 10/2018 | Steiner et al. | |
| 10,419,655 B2 | 9/2019 | Sivan | |
| 10,529,003 B2 | 1/2020 | Mazed | |
| 10,584,916 B2 | 3/2020 | Gan et al. | |
| 11,501,210 B1* | 11/2022 | Zhdanov | G06N 20/00 |
| 2003/0217026 A1 | 11/2003 | Teig et al. | |
| 2013/0159206 A1 | 6/2013 | Barahona et al. | |
| 2015/0081599 A1* | 3/2015 | Dobler | G01R 31/00 |
| | | | 706/12 |
| 2015/0106035 A1 | 4/2015 | Vecchio et al. | |
| 2015/0199607 A1 | 7/2015 | Fang | |
| 2016/0179162 A1 | 6/2016 | Eastep et al. | |
| 2017/0261949 A1 | 9/2017 | Hoffmann et al. | |
| 2017/0285123 A1* | 10/2017 | Kaditz | G01R 33/5608 |
| 2018/0136356 A1* | 5/2018 | Wilson | E21B 47/113 |
| 2018/0165603 A1 | 6/2018 | Van Seijen et al. | |
| 2018/0240031 A1 | 8/2018 | Huszar et al. | |
| 2018/0361514 A1 | 12/2018 | Narayanan et al. | |
| 2019/0050628 A1 | 2/2019 | Sankaranarayanan et al. | |
| 2019/0279094 A1* | 9/2019 | Baughman | G06N 3/082 |
| 2019/0370955 A1* | 12/2019 | Zhang | G06N 20/00 |
| 2020/0042776 A1* | 2/2020 | Shen | G06V 10/764 |
| 2020/0250491 A1* | 8/2020 | Peng | G06V 40/197 |
| 2021/0042609 A1* | 2/2021 | Owoyele | G06F 7/582 |
| 2021/0089921 A1* | 3/2021 | Aghdasi | G06N 5/04 |
| 2021/0174215 A1 | 6/2021 | Chan et al. | |
| 2021/0233191 A1* | 7/2021 | Shin | G06Q 50/20 |
| 2022/0101828 A1* | 3/2022 | Fukutomi | G10L 15/06 |

FOREIGN PATENT DOCUMENTS

| | | | | |
|---|---|---|---|---|
| CN | 108304679 A | * | 7/2018 | G06F 30/367 |
| CN | 108427939 A | * | 8/2018 | G06K 9/00221 |
| CN | 108896943 A | * | 11/2018 | G01R 33/4818 |
| CN | 109146064 A | * | 1/2019 | G06N 3/0454 |
| CN | 109657793 A | * | 4/2019 | G06N 3/08 |
| CN | 109918684 A | * | 6/2019 | G06N 3/0454 |
| CN | 109920501 A | * | 6/2019 | |
| CN | 110619527 A | * | 12/2019 | G06K 9/00892 |
| CN | 110737824 A | * | 1/2020 | G06K 9/00771 |
| CN | 110745136 A | * | 2/2020 | B60W 30/18 |
| CN | 110879951 A | * | 3/2020 | G06K 9/00771 |
| WO | WO-2019/012279 A1 | | 1/2019 | |

OTHER PUBLICATIONS

Abascal & Vega, "A general purpose model for the condensed phases of water: TIP4P/2005," The Journal of Chemical Physics 123, 234505, 12 pages (2005).

Abascal, et al., "A potential model for the study of ices and amorphous water: TIP4P/Ice," Journal of Chemical Physics 122(23), 234511,9 pages (2005).

Agarwal, et al., "Thermodynamic, Diffusional, and Structural Anomalies in Rigid-Body Water Models," Journal of Physical Chemistry B 115(21), pp. 6935-6945 (2011).

Agarwal, et al., "Thermodynamic, Diffusional, and Structural Anomalies in Rigid-Body Water Models," The Journal of Physical Chemistry C 115(21), pp. 6935-6945 (2011).

Amaya, et al., "How Cubic Can Ice Be?," The Journal of Physical Chemistry Letters 8(14), pp. 3216-3222 (2017).

Berendsen, et al., "The missing term in effective pair potentials," Journal of Physical Chemistry 91(24), pp. 6269-6271 (1987).

Bigg & Hopwood, "Ice Nuclei in the Antarctic," Journal of the Atmospheric Sciences 20(3), pp. 185-188 (1963).

Blackford, "Sintering and microstructure of ice: a review," Journal of Physics D: Applied Physics 40(21), pp. R355-R385 (2007).

Boulton & Hindmarsh, "Sediment deformation beneath glaciers: Rheology and geological consequences," Journal of Geophysical Research: Solid Earth 92(B9), pp. 9059-9082 (1987).

Chickos & Acree, "Enthalpies of Sublimation of Organic and Organometallic Compounds. 1910-2001," Journal of Physical and Chemical Reference Data 31(2), pp. 537-698 (2002).

Chickos & Acree, "Enthalpies of Sublimation of Organic and Organometallic Compounds. 1910-2001," Journal of Physical and Chemical Reference Data 31, 537 (2002).

Darre, et al., "Coarse-grained models of water," WIREs Computational Molecular Science 2(6), pp. 921-930 (2012).

Demott, et al., "Predicting global atmospheric ice nuclei distributions and their impacts on climate," Proceedings of the National Academy of Sciences 107(25), pp. 11217-11222 (2010).

Doran, et al., "Climate forcing and thermal feedback of residual lake-ice covers in the high Arctic," Limnology & Oceanography 41(5), pp. 839-848 (1996).

Durand, et al., "Deformation of grain boundaries in polar ice," Europhysics Letters 67(6), pp. 1038-1044 (2004).

Durham & Stern, "Rheological Properties of Water Ice—Applications to Satellites of the Outer Planets," Annual Review of Earth and Planetary Sciences 29, pp. 295-330 (2001).

Durham, et al., "Effects of dispersed particulates on the rheology of water ice at planetary conditions," Journal of Geophysical Research: Planets 97(E12), pp. 20883-20897 (1992).

Engel, et al., "Anharmonic Nuclear Motion and the Relative Stability of Hexagonal and Cubic ice," Physical Review X 5, 021033, 10 pages (2015).

Espinosa, et al., "Ice-Water Interfacial Free Energy for the TIP4P, TIP4P/2005, TIP4P/Ice, and mW Models as Obtained from the Mold Integration Technique," The Journal of Physical Chemistry C 120(15), pp. 8068-8075 (2016).

Espinosa, et al., "The mold integration method for the calculation of the crystal-fluid interfacial free energy from simulations," The Journal of Chemical Physics 141, 134709, 16 pages (2014).

Ester, et al., "A density-based algorithm for discovering clusters a density-based algorithm for discovering clusters in large spatial databases with noise," Proceedings of the Second International Conference on Knowledge Discovery and Data Mining, pp. 226-231 (1996).

Ester, et al., "A Density-Based Algorithm for Discovering Clusters in Large Spatial Databases with Noise," Proceedings of the Second International Conference on Knowledge Discovery and Data Mining, pp. 226-231 (1996).

Faken, et al., "Systematic analysis of local atomic structure combined with 3D computer graphics," Computational Materials Science, vol. 2, Issue 2, pp. 279-286 (Mar. 1994).

Faria, et al., "The microstructure of polar ice. Part I: Highlights from ice core research," Journal of Structural Geology 61, pp. 2-20 (2014).

Fisher & Koerner, "On the Special Rheological Properties of Ancient Microparticle-Laden Northern Hemisphere Ice as Derived from Bore-Hole and Core Measurements," Journal of Glaciology 32(112), pp. 501-510 (1986).

Ghormley, "Enthalpy Changes and Heat-Capacity Changes in the Transformations from High-Surface-Area Amorphous Ice to Stable Hexagonal Ice," The Journal of Chemical Physics 48, pp. 503-508 (1968).

(56) References Cited

OTHER PUBLICATIONS

Gillen, et al., "Self-Diffusion in Liquid Water to −31 C," Journal of Chemical Physics 57(12), pp. 5117-5119 (1972).
Gillen, et al., "Self-Diffusion in Liquid Water to −31C," The Journal of Chemical Physics 57, pp. 5117-5119 (1972).
Gow & Williamson, "Rheological implications of the internal structure and crystal fabrics of the West Antarctic ice sheet as revealed by deep core drilling at Byrd Station," Geological Society of America Bulletin 87(12), pp. 1665-1677 (1976).
Gow, et al., "Physical and structural properties of the Greenland Ice Sheet Project 2 ice core: A review," Journal of Geophysical Research: Oceans 102(C12), pp. 26559-26575 (1997).
Grenfell, et al., "Reflection of solar radiation by the Antarctic snow surface at ultraviolet, visible, and near-infrared wavelengths," Journal of Geophysical Research: Atmospheres 99(D9), pp. 18669-18684 (1994).
Hadley & Mccabe, "Coarse-grained molecular models of water: a review," Molecular Simulation 38(8-9), pp. 671-681 (2012).
Haji-Akbari & Debenedetti, "Direct calculation of ice homogeneous nucleation rate for a molecular model of water," Proceedings of the National Academy of Sciences 112(34), pp. 10582-10588 (2015).
Handel, et al., "Direct Calculation of Solid-Liquid Interfacial Free Energy for Molecular Systems: TIP4P Ice-Water Interface," Physical Review Letters 100, 036104, 4 pages (2008).
Hansen, et al., "Modelling Ice Ic of Different Origin and Stacking-Faulted Hexagonal Ice Using Neutron Powder Diffraction Data," Physics and Chemistry of Ice: Proceedings of the 11th International Conference, pp. 201-208 (2007).
Henkelman & Jonsson, "Improved tangent estimate in the nudged elastic band method for finding minimum energy paths and saddle points," The Journal of Chemical Physics 113, pp. 9978-9985 (2000).
Henkelman, et al., "A climbing image nudged elastic band method for finding saddle points and minimum energy paths," The Journal of Chemical Physics 113, pp. 9901-9940 (2000).
Holz, et al., "Temperature-dependent self-diffusion coefficients of water and six selected molecular liquids for calibration in accurate 1H NMRPFG measurements," Physical Chemistry Chemical Physics 2(20), pp. 4740-4742 (2000).
Hondoh, "Dislocation mechanism for transformation between cubic ice Ic and hexagonal ice Ih," Philosophical Magazine 95(32), pp. 3590-3620 (2015).
Hondoh, et al., "Formation and annihilation of stacking faults in pure ice," The Journal of Physical Chemistry 87(21), pp. 4040-4044 (1983).
Horn, et al., "Development of an improved four-site water model for biomolecular simulations: TIP4P-Ew," Journal of Chemical Physics 120(20), pp. 9665-9678 (2004).
Hudait, et al., "Free energy contributions and structural characterization of stacking disordered ices," Physical Chemistry Chemical Physics 18(14), pp. 9544-9553 (2016).
Jacobson, et al., "How Short is too Short for the Interactions of a Water Potential? Exploring the Parameter Space of a Coarse-Grained Water Model Using Uncertainty Quantification," The Journal of Physical Chemistry B 118(28), pp. 8190-8202 (2014).
Johnston & Molinero, "Crystallization, Melting, and Structure of Water Nanoparticles at Atmospherically Relevant Temperatures," Journal of the American Chemical Society 134(15), pp. 6650-6659 (2012).
Jorgensen & Madura, "Temperature and size dependence for Monte Carlo simulations of TIP4P water," Molecular Physics 56(6), pp. 1381-1392 (1985).
Jorgensen & Tirado-Rives, "Potential energy functions for atomic-level simulations of water and organic and biomolecular systems," Proceedings of the National Academy of Sciences 102(19), pp. 6665-6670 (2005).
Jorgensen, et al., "Comparison of simple potential functions for simulating liquid water," Journal of Chemical Physics 79, pp. 926-935 (1983).
Ketcham & Hobbs, "An experimental determination of the surface energies of ice," The Philosophical Magazine: A Journal of Theoretical Experimental and Applied Physics 19(162), pp. 1161-1173 (1969).
Kokhanovsky, et al., "Reflective properties of natural snow: approximate asymptotic theory versus in situ measurements," IEEE Transactions on Geoscience and Remote Sensing 43(7), pp. 1529-1535 (2005).
Kuhs, et al., "Extent and relevance of stacking disorder in 'ice Ic'," Proceedings of the National Academy of Sciences 109(52), p. 21259-21264 (2012).
Kuo, et al., "Liquid Water from First Principles: Investigation of Different Sampling Approaches," The Journal of Physical Chemistry B 108(34), pp. 12990-12998 (2004).
Lee, "Temperature Dependence on Structure and Self-Diffusion of Water: A Molecular Dynamics Simulation Study using SPC/E Model," Bulletin of the Korean Chemical Society 34(12), pp. 3800-3804 (2013).
Li, et al., "Freeze casting of porous materials: review of critical factors in microstructure evolution," International Materials Review 57(1), pp. 37-60 (2013).
Liu, et al., "Direct Measurement of Critical Nucleus Size in Confined Volumes," Langmuir 23(13), pp. 7286-7292 (2007).
Lu, et al., "Coarse-Graining of TIP4P/2005, TIP4P-Ew, SPC/E, and TIP3P to Monatomic Anisotropic Water Models Using Relative Entropy Minimization," Journal of Chemical Theory and Computation 10(9), pp. 4104-4120 (2014).
Lupi, et al., "Role of stacking disorder in ice nucleation," Nature 551, pp. 218-222 (2017).
Mahoney & Jorgensen, "A five-site model for liquid water and the reproduction of the density anomaly by rigid, nonpolarizable potential functions," Journal of Chemical Physics 112(20), pp. 8910-8922 (2000).
Mahoney & Jorgensen, "A five-site model for liquid water and the reproduction of the density anomaly by rigid, nonpolarizable potential functions," The Journal of Chemical Physics 112, pp. 8910-8922 (2000).
Majewski, et al., "Toward a Determination of the Critical Size of Ice Nuclei. A Demonstration by Grazing Incidence X-ray Diffraction of Epitaxial Growth of Ice under the C31H63OH Alcohol Monolayer," Journal of Physical Chemistry 98(15), pp. 4087-4093 (1994).
Malkin, et al., "Stacking disorder in ice I," Physical Chemistry Chemical Physics 17(1), pp. 60-76 (2015).
Malkin, et al., "Structure of ice crystallized from supercooled water," Proceedings of the National Academy of Sciences 109(4), pp. 1041-1045 (2012).
Mangold, et al., "Experimental and theoretical deformation of ice-rock mixtures: Implications on rheology and ice content of Martian permafrost," Planetary and Space Science 50(4), pp. 385-401 (2002).
Maras, et al., "Global transition path search for dislocation formation in Ge on Si(001)," Cornell University Library Materials Science, 29 pages (Jan. 25, 2016).
Maras, et al., "Global transition path search for dislocation formation in Ge on Si(001)," Computer Physics Communications 205, pp. 13-21 (2016).
Marrone & Car, "Nuclear Quantum Effects in Water," Physical Review Letters 101, 017801, 4 pages (2008).
Mcmillan & Los, "Vitreous Ice: Irreversible Transformations During Warm-Up," Nature 206, pp. 806-807 (1965).
Molinero & Moore, "Water Modeled as an Intermediate Element between Carbon and Silicon," The Journal of Physical Chemistry B 113(13), pp. 4008-4016 (2009).
Montagnant & Duval, "The viscoplastic behaviour of ice in polar ice sheets: experimental results and modelling," Comptes Rendus Physique 5(7), pp. 699-708 (2004).
Montagnat & Duval, "Rate controlling processes in the creep of polar ice, influence of grain boundary migration associated with recrystallization," Earth and Planetary Science Letters 183(1-2), pp. 179-186 (2000).
Montagnat, et al., "Lattice distortion in ice crystals from the Vostok core (Antarctica) revealed by hard X-ray diffraction; implication in

(56) References Cited

OTHER PUBLICATIONS the deformation of ice at low stresses," Earth and Planetary Science Letters 214(1-2), pp. 369-378 (2003).
Moore & Molinero, "Is it cubic? Ice crystallization from deeply supercooled water," Physical Chemistry Chemical Physics 13(44), pp. 20008-20016 (2011).
Moore & Molinero, "Ice crystallization in water's 'no man's land'," Journal of Chemical Physics 132, 244504 (2010).
Murray, et al., "The formation of cubic ice under conditions relevant to Earth's atmosphere," Nature 434, pp. 202-205 (2005).
Nada & Van Der Eerden, "An intermolecular potential model for the simulation of ice and water near the melting point: A six-site model of H2O," Journal of Chemical Physics 118(16), pp. 7401-7413 (2003).
Nakano, "A space-time-ensemble parallel nudged elastic band algorithm for molecular kinetics simulation," Computer Physics Communications 178(4), pp. 280-289 (2008).
Narten, et al., "Diffraction pattern and structure of amorphous solid water at 10 and 77 K," Journal of Chemical Physics 64, pp. 1106-1121 (1976).
Narten, et al., "Diffraction pattern and structure of amorphous solid water at 10 and 77K," The Journal of Chemical Physics 64, pp. 1106-1121 (1976).
Nelder & Mead, "A Simplex Method for Function Minimization," The Computer Journal 7(4), pp. 308-313 (1965).
Orsi, et al., "Comparative assessment of the ELBA coarse-grained model for water," Molecular Physics 112(11), pp. 1566-1576 (2014).
Perovich & Elder, "Temporal evolution of Arctic sea-ice temperature," Annals of Glaciology 33, pp. 207-211 (2001).
Perovich, et al., "Variability in Arctic sea ice optical properties," Journal of Geophysical Research: Oceans 103(C1), pp. 1193-1208 (1998).
Petrovic, "Review Mechanical properties of ice and snow," Journal of Materials Science 38(1), pp. 1-6 (2003).
Pi, et al., "Anomalies in water as obtained from computer simulations of the TIP4P/2005 model: density maxima, and density, isothermal compressibility and heat capacity minima," Molecular Physics 107(4-6), pp. 365-374 (2009).
Plata, et al., "An efficient and accurate framework for calculating lattice thermal conductivity of solids: AFLOW—AAPL Automatic Anharmonic Phonon Library," npj Computational Materials 3, 45, 10 pages (2017).
Plimpton, "Fast Parallel Algorithms for Short-Range Molecular Dynamics," Journal of Computational Physics 117(1), pp. 1-19 (1995).
Qiu, et al., "Is Water at the Graphite Interface Vapor-like or Ice-like?," The Journal of Physical Chemistry B 122(13), pp. 3626-3634 (2018).
Reddy, et al., "On the accuracy of the MB-pol many-body potential for water: Interaction energies, vibrational frequencies, and classical thermodynamic and dynamical properties from clusters to liquid water and ice," The Journal of Chemical Physics 145, 194504, 37 pages (2016).
Ren & Ponder, "Polarizable Atomic Multipole Water Model for Molecular Mechanics Simulation," The Journal of Physical Chemistry B 107(24), pp. 5933-5947 (2003).
Schiotz, et al., "Softening of nanocrystalline metals at very small grain sizes," Nature 391, pp. 561-563 (1998).
Shilling, et al., "Measurements of the vapor pressure of cubic ice and their implications for atmospheric ice clouds," Geophysical Research Letters 33(17), L17801, 5 pages (2006).
Skinner, et al., "The structure of water around the compressibility minimum," Journal of Chemical Physics 141, 214507, 7 pages (2014).
Skinner, et al., "The structure of water around the compressibility minimum," The Journal of Chemical Physics 141, 214507, 7 pages (2014).
Smith, et al., "Less is more: Sampling chemical space with active learning," The Journal of Chemical Physics 148, 241733, 24 pages (2018).
Soper, "The Radial Distribution Functions of Water as Derived From Radiation Total Scattering Experiments: Is There Anything we can Say for Sure?," ISRN Physical Chemistry, 279463, 67 pages (2013).
Soper, "The Radial Distribution Functions of Water as Derived From Radiation Total Scattering Experiments: Is There Anything we can Say for Sure?," International Scholarly Research Notices: Physical Chemistry 2013, 279463, 67 pages (2013).
Sosso, et al., "Crystal Nucleation in Liquids: Open Questions and Future Challenges in Molecular Dynamics Simulations," Chemical Reviews 116(12), pp. 7078-7116 (2016).
Stuart, et al., "A reactive potential for hydrocarbons with intermolecular interactions," The Journal of Chemical Physics 112, pp. 6472-6486 (2000).
Stukowski, "Visualization and analysis of atomistic simulation data with OVITO—the Open Visualization Tool," Modelling and Simulation in Materials Science and Engineering 18, 015012, 7 pages (2010).
Tersoff, "New empirical approach for the structure and energy of covalent systems," Physical Review B 37, pp. 6991-7000 (1988).
Togo & Tanaka, "First principles phonon calculations in materials science," Scripta Materlialia 108, pp. 1-5 (2015).
Ushio, "Factors affecting fast-ice break-up frequency in Lutzow-Holm Bay, Antarctica," Annals of Glaciology 44, pp. 177-182 (2006).
Vega & Abascal, "Relation between the melting temperature and the 406 temperature of maximum density for the most common models of water," Journal of Chemical Physics 123(14), 144504, 8 pages (2005).
Vega & Abascal, "Relation between the melting temperature and the temperature of maximum density for the most common models of water," The Journal of Chemical Physics 123, 144504, 8 pages (2005).
Vega & Abascal, "Simulating water with rigid non-polarizable models: a general perspective," Physical Chemistry Chemical Physics 13(44), pp. 19663-19688 (2011).
Vega, et al., "The melting temperature of the most common models of water," The Journal of Chemical Physics 122, 114507, 9 pages (2005).
Vega, et al., "What ice can teach us about water interactions: a critical comparison of the performance of different water models," Faraday Discussions 141, pp. 251-276 (2009).
Wang, et al., "Systematic Improvement of a Classical Molecular Model of Water," The Journal of Physical Chemistry B 117(34), pp. 9956-9972 (2013).
Warren, "Optical properties of snow," Reviews of Geophysics 20(1), pp. 67-89 (1982).
Weeks & Lee, "Observations on the Physical Properties of Sea-Ice at Hopedale, Labrador," ARCTIC 11(3), pp. 134-155 (1958).
Weikusat, et al., "Subgrain boundaries and related microstructural features in EDML (Antarctica) deep ice core," Journal of Geology 55(191), pp. 461-472 (2009).
Wellner, et al., "Distribution of glacial geomorphic features on the Antarctic continental shelf and correlation with substrate: implications for ice behavior," Journal of Glaciology 47(158), pp. 397-411 (2001).
Worby, et al., "East Antarctic Sea Ice: A Review of Its Structure, Properties and Drift," Antarctic Sea Ice: Physical Processes, Interactions and Variability 74, pp. 41-67 (1998).
Budd & Jacka, "A review of ice rheology for ice sheet modelling," Cold Regions Science & Technology 16(2), pp. 107-144 (1989).
Yen, "Review of Thermal Properties of Snow, Ice and Sea Ice," CRREL Report 81-10, 37 pages (1981).

* cited by examiner

SYSTEMS AND METHODS FOR ACTIVE LEARNING FROM SPARSE TRAINING DATA

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present invention relates generally to systems and methods of training models, such as machine learning models. Certain embodiments relate to active learning from sparse training data.

BACKGROUND

Machine learning approaches, such as to train a neural network, may use large training datasets. For example, a dataset may involve hundreds of thousands to millions of data points. This can limit the ability to effectively generate trained models for situations where such datasets are not available or difficult to generate (e.g., if the dataset results from performing a real-world experiment).

SUMMARY

At least one aspect relates to a system. The system can include one or more processors configured to train a machine learning model using a first training data point to generate a candidate machine learning model, sample a first output of the candidate machine learning model, determine whether the first output satisfies a convergence condition, modify, responsive to the first output not satisfying the convergence condition, the candidate machine learning model using a second training data point corresponding to the first output, and output, responsive to the first output satisfying the convergence condition, the candidate machine learning model.

At least one aspect relates to a method for machine learning using sparse training data. The method can include training, by one or more processors, a machine learning model using a first training data point to generate a candidate machine learning model, sampling, by the one or more processors, a first output of the candidate machine learning model, determining, by the one or more processors, whether the first output satisfies a convergence condition, responsive to the first output not satisfying the convergence condition, modifying, by the one or more processors, the candidate machine learning model using a second training data point corresponding to the first output, and responsive to the first output satisfying the convergence condition, outputting, by the one or more processors, the candidate machine learning model.

At least one aspect relates to a method. The method can include training a machine learning model using less than ten first training data points to generate a candidate machine learning model, performing a Monte Carlo process to sample one or more first outputs of the candidate machine learning model, testing the one or more first outputs to determine if each of the one or more first outputs satisfy a respective convergence condition, responsive to at least one first output not satisfying the respective convergence condition, training the candidate machine learning model using at least one second training data point corresponding to the at least one first output, and responsive to the one or more first outputs each satisfying the respective convergence condition, outputting the candidate machine learning model.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

DETAILED DESCRIPTION

Embodiments described herein relate generally to methods of active learning using sparse training data. Effectively training machine learning models, such as neural networks, can require very large datasets (e.g., on the order of hundreds of thousands of data points). Some approaches, such as query by committee, can reduce the number of data points required for training, but do not address the underlying problem of generating the large dataset itself. This may particularly limit the ability to train models where the dataset is based on performing real-world experiments or performing computationally intensive simulations of a system, where it may be impractical to prepare a sufficient number training data points before training a machine learning model.

Systems and methods performed in accordance with the present solution can enable active learning from sparse training data, such as to perform machine learning even with a relatively sparse dataset generated from experimental data. For example, the active learning can train a neural network with a small dataset (e.g., dataset of one point), query a sample of validation data points, and evaluate the performance of the neural network using the sampled data points. Responsive to the evaluation, poorly performing data points can be iteratively added to the training dataset until the evaluation of the neural network satisfies a convergence condition. Systems and methods in accordance with the present solution can reduce the number of data points needed to perform the machine learning to the order of a few hundred, such as by focusing training of the model on portions of the sample space for which the model initially performs poorly. This can enable models to be trained more quickly or with lesser computational resources, and to achieve target performance without requiring large amounts of experimental data to be generated.

Figure 1:
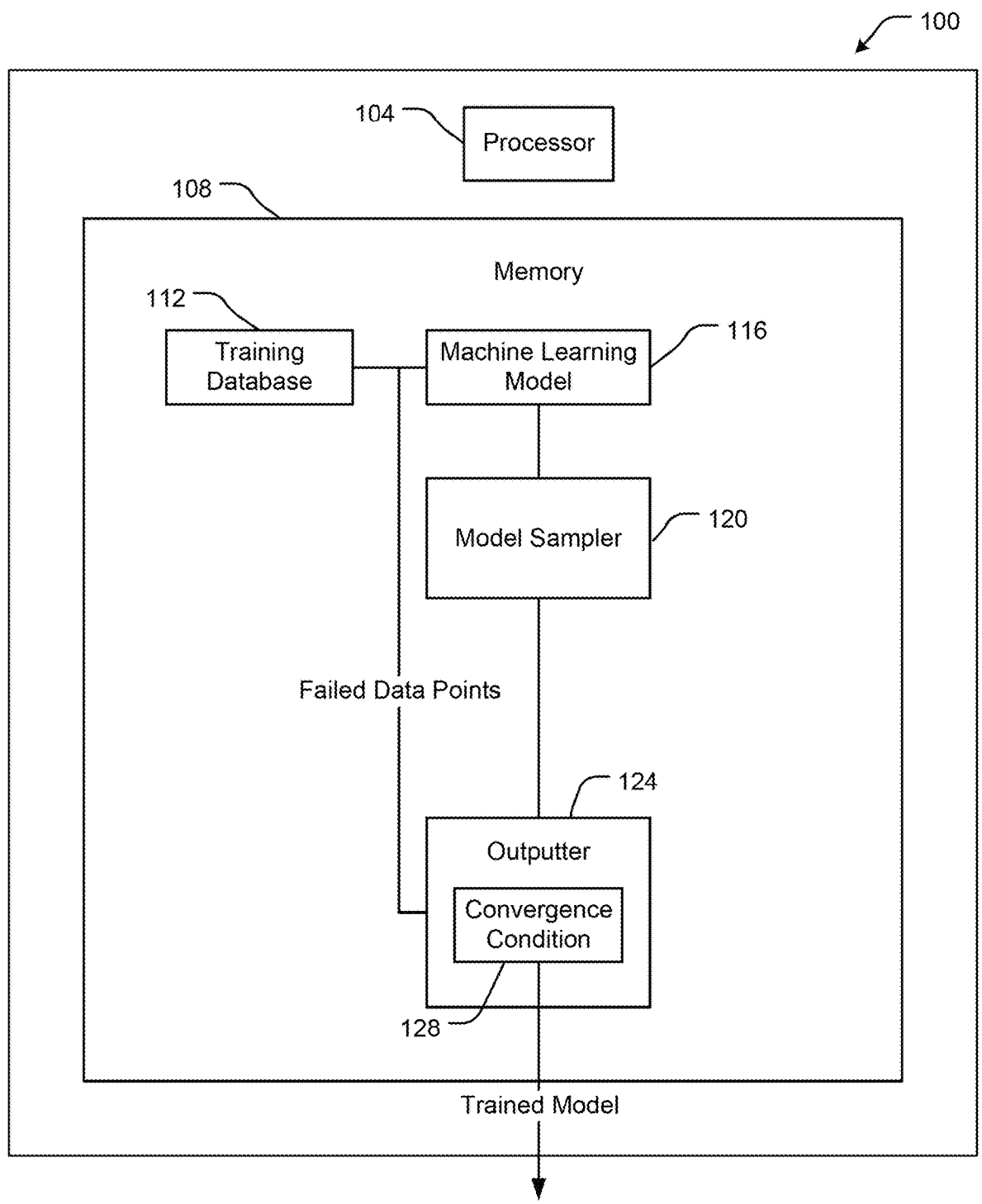
FIG. 1 is a block diagram of a learning system.

FIG. 1 depicts a system 100 for active learning from sparse training data. The system 100 includes one or more processors 104 and memory 108, which can be implemented as one or more processing circuits. The processor 104 may be a general purpose or specific purpose processor, an application specific integrated circuit (ASIC), one or more field programmable gate arrays (FPGAs), a group of processing components, or other suitable processing components. The processor 104 may be configured to execute computer code or instructions stored in memory 108 (e.g., fuzzy logic, etc.) or received from other computer readable media (e.g., CDROM, network storage, a remote server, etc.) to perform one or more of the processes described herein. The memory 108 may include one or more data storage devices (e.g., memory units, memory devices, computer-readable storage media, etc.) configured to store data, computer code, executable instructions, or other forms of computer-readable information. The memory 108 may include random access memory (RAM), read-only memory (ROM), hard drive storage, temporary storage, non-volatile memory, flash memory, optical memory, or any other suitable memory for storing software objects and/or computer instructions. The memory 108 may include database components, object code components, script components, or any other type of information structure for supporting the various activities and information structures described in the present disclosure. The memory 108 may be communicably connected to the processor 104 and may include computer code for executing (e.g., by processor 104) one or more of the processes described herein. The memory 108 can include various modules (e.g., circuits, engines) for completing processes described herein. The one or more processors 104 and memory 108 may include various distributed components that may be communicatively coupled by wired or wireless connections; for example, various portions of system 100 may be implemented using one or more client devices remote from one or more server devices. The memory 108 can include various software or firmware engines, modules, scripts, databases, or other computer code to implement the various components described herein, including the training database 112, machine learning model 116, model sampler 120, outputter 124, convergence condition 128, or features or functions thereof. Various aspects of the system 100 may be distributed across one or more devices, which may be connected using wired or wireless networks.

The system 100 can include a training database 112. The training database 112 can include training data points that can be used to train a model (e.g., model 116). For example, the training data points can be represented using a data structure that includes one or more data point values for each of one or more parameters that are to be provided as inputs to the model, and an output value (e.g., free energy value) associated with the data point values. The training data points can represent material properties, environmental properties, or various other properties of the models or systems to be optimized. For a given model to be trained, the training database 112 can include training data points up to the order of thousands (e.g., rather than several tens or hundreds of thousands or more).

The training database 112 can correspond to experimental values, values from simulations, or combinations thereof. For example, the training database 112 can include experimental data points that include input values for one or more input parameters to a system to be represented by the model and output values for one or more outputs corresponding to the input values. For example, a training data point can include inputs such as an identifier of a material, a measured temperature of the material, a measured pressure of the material, and outputs such as a free energy of the material measured at the measured temperature and the measured pressure. The output may include a force associated with the component or system to be modeled (e.g., a force in eV/Angstrom).

The system 100 can include a model 116. The model 116 can be a machine learning model for which the system 100 is to perform supervised learning. The model 116 can be any of a variety of machine learning models that can be trained using supervised learning, including but not limited to neural networks, regression models, support vector machines, decision trees, random forest models, and naïve Bayes models. The system 100 can train the model 116 by providing training data points from the training database 112 as input to the model, causing the model 116 to generate a candidate output using the input, and modifying various components of the model 116 to satisfy a convergence condition (e.g., until the candidate output changes less than a threshold amount between subsequent iterations—this may be different than convergence condition 128 described below).

The model 116 can include a neural network, which may include an input layer, one or more hidden layers, and an output layer. Each layer can include nodes that receive respective inputs (which may be from a previous layer) and generate outputs (which may be provided to a subsequent layer). The nodes of the hidden layers can have weights and biases that the nodes apply to the received inputs to generate output. The system 100 can train the neural network by applying an optimization function to the neural network to cause the weights and biases to be adjusted until an optimization condition is satisfied.

The model 116 can be trained using a relatively small number of training data points. For example, the system 100 can retrieve one or more first training data points from the training database 112 and provide the one or more first training data points as input to the model 116 (e.g., in a first iteration). A number of the one or more first training data points can be less than one hundred, less than fifty, less than twenty, less than ten, less than five, or one.

The system 100 may group at least some of the training data points of the training database 112 into training points (which may be used to train the model 116) and validation data points (which may be used by model sampler 120 as described below to select inputs to use to sample the trained model 116, based on which sampled outputs of the trained model 116 can be compared to outputs of the validation data points to evaluate convergence condition 128).

The model sampler 120 can sample the trained model 116 to retrieve one or more outputs of the trained model 116. The model sampler 120 can perform a random or pseudo-random process to retrieve the one or more outputs. The model sampler 120 can sample the trained model 116 by identifying one or more inputs to provide to the trained model 116 so that the trained model 116 provides the one or more outputs responsive to the one or more inputs. For example, the model sampler 120 can identify the one or more inputs using input values of training data points from the training database 112 (which may not necessarily include the training data points used to train the model 116) and query the trained model 116 to receive outputs corresponding to the input values of training data points from the training database 112.

The model sampler 120 can perform a Monte Carlo process to retrieve the one or more outputs. For example, the model sampler 120 can identify a domain of inputs that includes inputs of the training data points of the training database 112. The model sampler 120 can randomly select one or more inputs from the domain of inputs, such as by selecting the one or more inputs using a probability distribution of the domain of inputs or based on a distance from inputs used to sample the model 116 in previous iterations.

The outputter 124 can determine whether to output the trained model 116 or continue training of the trained model 116 by evaluating convergence condition 128 using the sampled outputs of the trained model 116. The convergence condition 128 may include a condition based on a difference between the sampled output(s) of the trained model 116 and the outputs of the training data points having the inputs used by the model sampler 120 to sample the trained model 116.

For example, the outputter 124 can compare the one or more outputs sampled from the trained model 116 to corresponding one or more outputs of the training data points, determine a difference based on the comparison, compare the difference to a threshold represented by the convergence condition 128, and determine to output the trained model 116 responsive to the difference being less than the threshold. The outputter 124 can compare the one or more outputs to a ground truth value, such as a predetermined output value (e.g., predetermined based on user input, experimental data, or output of a different model used as a baseline for comparison).

The outputter 124 can compare the one or more outputs with a reference output or reference data point (e.g., synthetic data point; synthetic output) generated by a reference high-fidelity model. The reference high-fidelity model can be a model that is more computationally expensive for generating output than the model 116 (and, in turn, may have greater accuracy). The reference high-fidelity model can include at least one of a density functional theory model, a quantum Monte Carlo model, or a coupled clusters model.

The outputter 124 can determine the difference in various manners, such as by determining a Euclidean norm between the one or more outputs outputted by the trained model 116 and the corresponding one or more outputs of the training data points. Responsive to the trained model 116 satisfying the convergence condition 128, the outputter 124 can output the trained model 116. The outputter 124 can evaluate the convergence condition 128 by determining a mean absolute error between the sampled output from the trained model 116 and the actual values of the training data points corresponding to the sampled output.

For example, the training data points may include a data structure that includes temperature and pressure as input values and free energy as an output value. The output of the model 116 (e.g., as sampled by the model sampler 120) can include free energy values that correspond to input values of temperature and pressure. The system 100 can evaluate the convergence condition by comparing, for each sampled output, the free energy value outputted by the model 116 for a particular temperature and particular pressure to the corresponding free energy value of the training data point having the same particular temperature and particular pressure.

Responsive to the trained model 116 not satisfying the convergence condition 128, the system 100 can continue to train the model 116. For example, the system 100 can identify the training data points of the training database 112 that correspond to the sampled outputs of the trained model 116 that the model sampler 120 sampled in order for the outputter 124 to evaluate the convergence condition 128. The system 100 can provide the identified training data points as input to the model 116 to train the model 116. The system 100 can also include the one or more first training data points as input to the model 116 (in addition to the identified training data points) to train the model 116. For example, the system 100 can provide training data points having the input values of the points sampled by model sampler 120 and corresponding output values as training data points to the model 116.

By providing the identified training data points as input to the model 116, the system 100 can efficiently cause the model 116 to more effectively be trained in portions of the space over which the model 116 is to be trained for which it had performed poorly, while maintaining a relatively small number of data points used to train the model 116. The system 100 can iteratively proceed through training the model 116, sampling the model 116 (e.g., using model sampler 120), determining whether the model 116 has converged (e.g., based on evaluating sampled outputs of the model 116 using the convergence condition 128), and outputting the model 116 if the model 116 has converged (e.g., if the sampled data points of the model 116 perform well against the corresponding outputs of the training data of the training database 112) or using the sampled data points to further train the model 116 if the model 116 has not converged (e.g., if the sampled data points did not perform well against corresponding outputs of the training data of the training database 112).

Figure 2A:
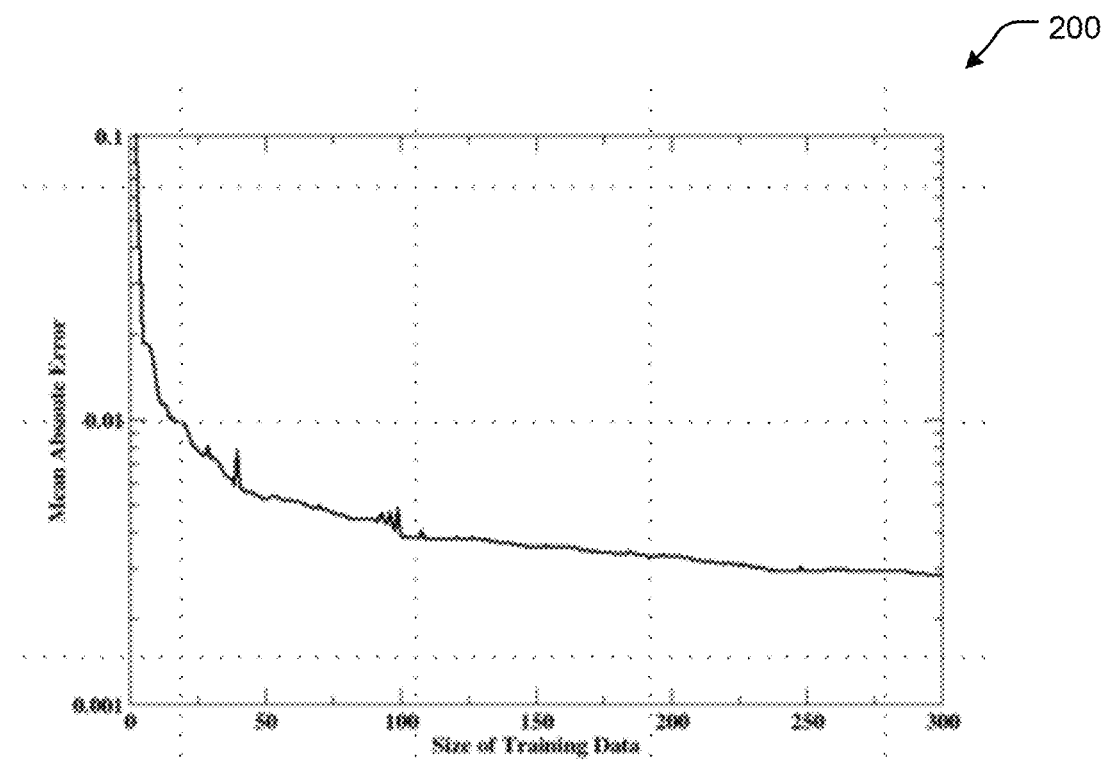
FIGS. 2A and 2B depict performance of a learning system training using sparse training data.
Figure 2B:
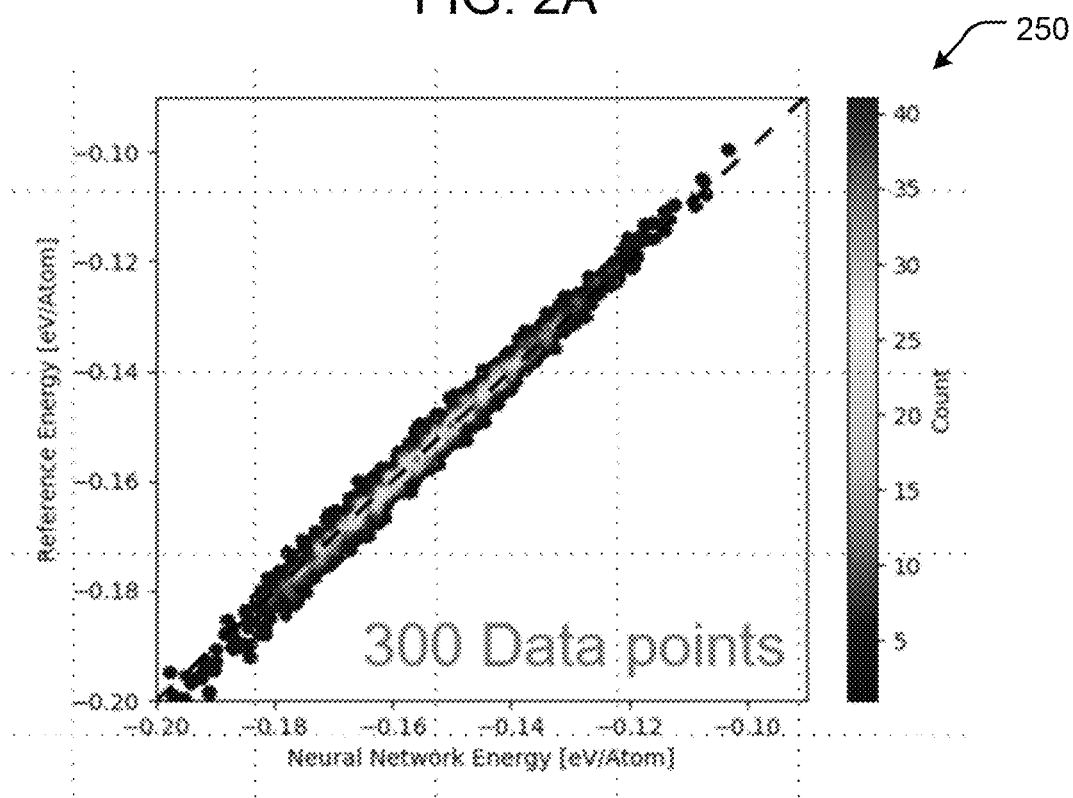

FIGS. 2A-2B depict an example of performance of a model trained in accordance with present disclosure. As depicted in chart 200, a mean absolute error between output of the model and the actual values of the training data points can decrease below 0.01 with less than 25 training data points, towards 0.003 with 300 training data points. Chart 250 depicts performance of a model trained using 300 data points. The model performed with close correspondence between free energy values as determined by the model compared to free energy values of the training data points used to train the model.

Figure 3:
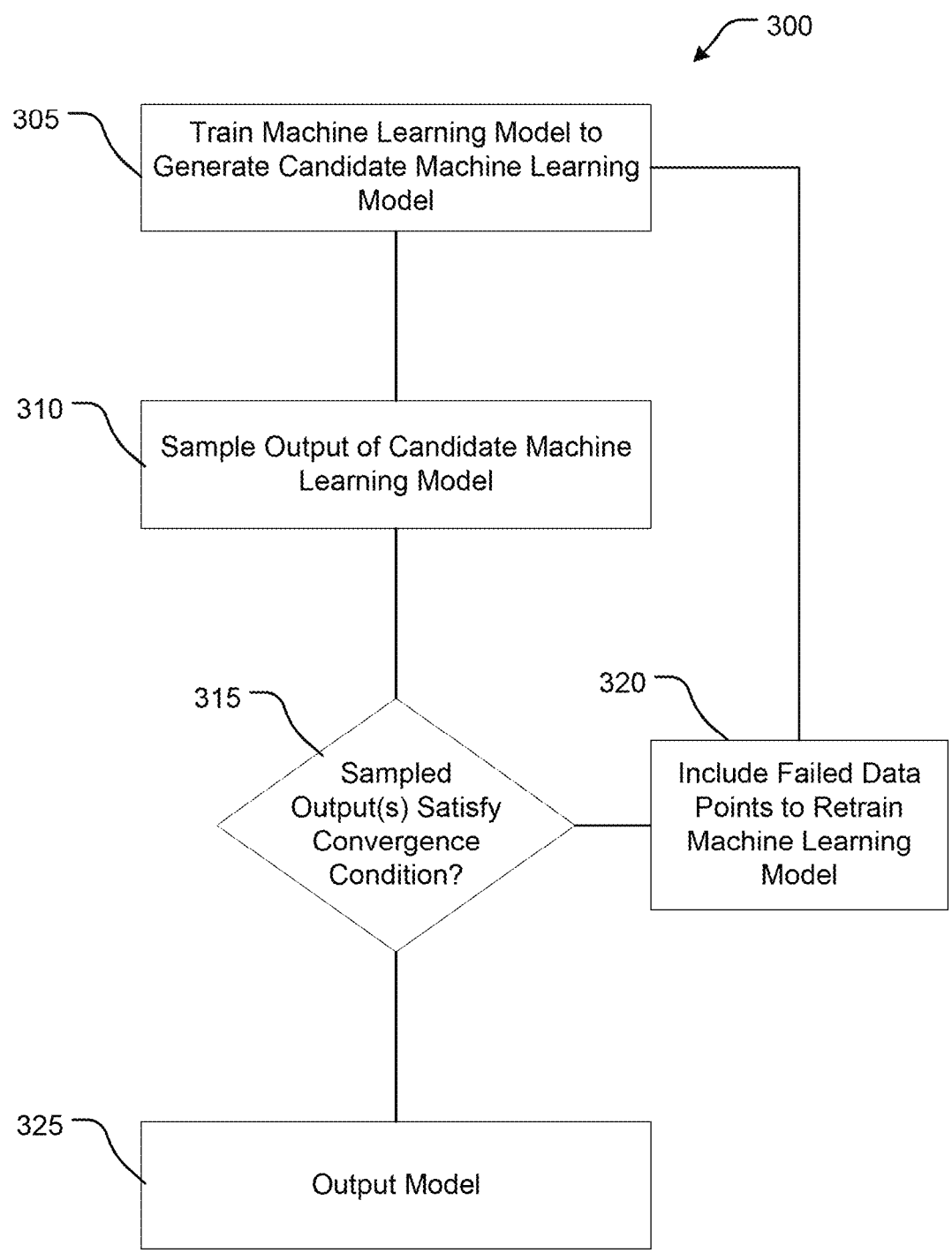
FIG. 3 is a flow diagram of a method for active learning using sparse training data.

FIG. 3 depicts a method 300 for active learning. The method 300 can be performed using various systems described herein, including the system 100. Various steps in the method 300 may be repeated, omitted, performed in various orders, or otherwise modified.

At 305, a machine learning model can be trained to generate a candidate machine learning model. The machine learning model can be trained using a relatively small number of training data points (e.g., sparse training data). For example, the machine learning model can be trained (e.g., in a first iteration) using at least one and less than or equal to ten training data points. Each training data point can be a data structure that includes one or more input values (e.g., material identifiers, temperature, pressure, or other characteristics of the material or component to be modeled) associated with one or more output values (e.g., free energy). The training data points (e.g., one or more first training data points for the first iteration) can be provided as input to the machine learning model to train the machine learning model to generate the candidate machine learning model.

The machine learning model may include a neural network that is trained by providing the training data point(s) as input to an input layer of the neural network, and using an optimization function (e.g., cost function) to adjust weights and biases of one or more hidden layers of the neural network to generate the candidate machine learning model as a candidate neural network (e.g., a candidate neural network in which a difference between outputs of the candidate neural network and outputs of the training data are minimized).

At 310, an output of the candidate machine learning model can be sampled. For example, in the first iteration, a first one or more candidate outputs of the candidate machine learning model can be sampled. The output can be sampled by providing input values corresponding to training data points (which are associated with predetermined output values, such as output values from experimentation or simulation) to the candidate machine learning model to receive candidate outputs responsive to the input values.

The output of the candidate machine learning model can be sampled by a random or pseudo-random. For example, a Monte Carlo process can be applied to sample the candidate machine learning model. The Monte Carlo process can be applied to randomly select training data points (e.g., input values of training data points) and to sample the candidate machine learning model using the randomly selected training data points. For example, the input value(s) of the randomly selected training data point(s) can be applied as input to the candidate machine learning model to generate sampled output from the candidate machine learning model.

At 315, it can be determined whether the sampled output (e.g., first output from a first iteration) satisfies a convergence condition. The convergence condition can represent the performance of the candidate machine learning model relative to the training data that the candidate machine learning model is to model. The sampled output can be evaluated by comparing the sampled output to reference values, such as reference values determined by a reference high-fidelity model.

For example, the convergence condition can be based on a threshold difference between the sampled output and the training data output corresponding to the sampled output. The convergence condition can be evaluated by determining a difference between the sampled output and the training data output corresponding to the sampled output, comparing the difference to the threshold difference, and determining that the sampled output satisfies the convergence condition responsive to the difference being less than or equal to the threshold difference. The difference can be determined as a norm between the sampled output and the training data output (e.g., determining a difference between each sampled output and the respective training data output corresponding to the same input value(s) as the sampled output, and aggregating the differences across the comparisons, such as to perform a Euclidean norm). The difference can be determined as a mean absolute error. The difference being greater than the threshold difference, such that the convergence condition is not satisfied, can indicate that the candidate machine learning model does not perform sufficiently well in representing the behavior of the system to be modeled, such that further training of the machine learning model should be performed.

The convergence condition may be evaluated for each sample data point—training data point pair, such as to identify particular data points for which the model did not perform effectively. For example, five sampled outputs may be sampled from the candidate machine learning model, and three of the five sampled outputs can be determined to not satisfy a respective convergence condition responsive to differences between those three sampled outputs and the corresponding training data outputs being less than respective threshold differences.

At 320, the candidate machine learning model can be modified responsive to the sampled output not satisfying the convergence condition (e.g., the candidate machine learning model not performing to target performance levels relative to the training data representing the system to be modeled).

The candidate machine learning model can be modified by performing further training of the candidate machine learning model (e.g., in a second or additional iteration). Modifying the candidate machine learning model can include reinitializing the machine learning model to an untrained state and training the untrained machine learning model using training data points corresponding to the sampled output(s).

The candidate machine learning model can be modified by training the candidate machine learning model using at least one training data point corresponding to the sampled output used to evaluate the convergence condition (e.g., in a previous iteration). For example, the training data points having input values that were used to sample the candidate machine learning model can be provided as input to the candidate machine learning model to train the candidate machine learning model. These training data points may represent data points that the model failed to model effectively, such that retraining using these data points (which may not have previously been used to train the model) can allow the model to be retrained in a targeted manner. The training data points having input values that were used to sample the candidate machine learning model can be provided as input in addition to or alternatively to the one or more first training data points used to train the candidate machine learning model in the previous iteration. The training data points corresponding to one or more particular sampled outputs that did not satisfy respective convergence conditions may be used to retrain the candidate machine learning model (e.g., while other training data points corresponding to one or more particular sampled outputs that did satisfy respective convergence conditions are not used for retraining).

At 325, responsive to the sampled output satisfying the convergence condition, the candidate machine learning model can be outputted. The sampled output satisfying the convergence condition can indicate that the candidate machine learning model has reached appropriate performance, such as appropriate performance relative to the system to be modeled (which may be represented by the training data points).

Definitions

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for machine learning using sparse training data, comprising:
    training, by one or more processors, a machine learning model using a first training data point of a plurality of training data points to generate a trained machine learning model, wherein training the machine learning model comprises modifying the machine learning model to satisfy a first convergence condition;
    selecting, by the one or more processors, a first input to provide to the trained machine learning model, the first input selected from a domain of inputs that includes inputs of the plurality of training data points by performing at least one of a random process or a Monte Carlo process, the first input associated with a first training data output;
    sampling, by the one or more processors, a first candidate output of the trained machine learning model by providing the first input as input to the trained machine learning model;
    determining, by the one or more processors, whether the first candidate output satisfies a second convergence condition based on a difference between the first training data output and the first candidate output, the second convergence condition different from the first convergence condition;

responsive to the first candidate output not satisfying the second convergence condition, modifying, by the one or more processors, the trained machine learning model using a second training data point of the plurality of training data points, the second training data point comprising the first input and the first training data output; and "responsive to the first candidate output satisfying the second convergence condition, outputting, by the one or more processors, the trained machine learning model.

2. The method of claim 1, wherein the first training data point is retrieved from a dataset comprising less than one thousand training data points.

3. The method of claim 1, wherein the machine learning model comprises a neural network comprising an input layer, one or more hidden layers, and an output layer.

4. The method of claim 1, wherein the first training data output is a reference output of a reference high-fidelity model.

5. The method of claim 1, wherein training the machine learning model using the first training data point comprises retraining the machine learning model using less than ten training data points.

6. The method of claim 1, wherein the first training data point comprises at least one of an experimental data point or a synthetic data point from a reference high-fidelity model.

7. The method of claim 1, wherein the plurality of training data points are from a first subset of data points of a training database, and the domain of inputs comprises a second subset of data points of the training database.

8. The method of claim 1, wherein:
sampling, by the one or more processors, the first candidate output comprises sampling a plurality of first candidate outputs of the trained machine learning model;
determining, by the one or more processors, whether the first candidate output satisfies the second convergence condition comprises determining, by the one or more processors, whether each first candidate output of the plurality of first candidate outputs satisfies a respective second convergence condition; and
modifying, by the one or more processors, the trained machine learning model comprises retraining the trained machine learning model using one or more second training data points corresponding to one or more first candidate outputs of the plurality of first candidate outputs that did not satisfy the respective second convergence condition.

9. The method of claim 1, wherein training the machine learning model comprises causing weights and biases of a neural network of the machine learning model to be adjusted until an optimization condition is satisfied.

10. A system, comprising:
one or more hardware processors configured to:
train a machine learning model using a first training data point of a plurality of training data points to generate a trained machine learning model, wherein training the machine learning model comprises modifying the machine learning model to satisfy a first convergence condition;
select a first input to provide to the trained machine learning model, the first input selected from a domain of inputs that includes inputs of the plurality of training data points by performing at least one of a random process or a Monte Carlo process, the first input associated with a first training data output;
sample a first candidate output of the trained machine learning model by providing the first input as input to the trained machine learning model;
determine whether the first candidate output satisfies a second convergence condition based on a difference between the first training data output and the first candidate output, the second convergence condition different from the first convergence condition;
modify, responsive to the first candidate output not satisfying the second convergence condition, the trained machine learning model using a second training data point of the plurality of training data points, the second training data point comprising the first input and the first training data output; and
output, responsive to the first candidate output satisfying the second convergence condition, the trained machine learning model.

11. The system of claim 10, wherein the first training data point is retrieved from a training database comprising less than one thousand training data points.

12. The system of claim 10, wherein the machine learning model comprises a neural network comprising an input layer, one or more hidden layers, and an output layer.

13. The system of claim 10, wherein the one or more processors are configured to train the machine learning model using the first training data point by training the machine learning model using less than ten training data points.

14. The system of claim 10, wherein the first training data point comprises at least one of an experimental data point or a synthetic data point from a reference high-fidelity model.

15. A method, comprising:
training a machine learning model using less than ten first training data points of a plurality of training data points to generate a trained machine learning model that satisfies a first convergence condition;
performing a Monte Carlo process to select a plurality of first inputs from the plurality of training data points, each first input of the plurality of first inputs corresponding to a first training data output of a plurality of first training data outputs;
applying the plurality of first inputs as input to the trained machine learning model to sample a plurality of first candidate outputs of the trained machine learning model;
testing the plurality of first candidate outputs to determine if each of the plurality of first candidate outputs satisfies a respective second convergence condition based on differences between the plurality of first candidate outputs and the plurality of first training data outputs, the respective second convergence condition different from the first convergence condition;
responsive to at least one first candidate output not satisfying the respective second convergence condition, training the trained machine learning model using at least one second training data point of the plurality of training data points corresponding to the at least one first candidate output, the at least one second training data point comprising at least one first input used as input to the trained machine learning model to sample the at least one first candidate output and its corresponding first training data output; and
responsive to the plurality of first candidate outputs each satisfying the respective second convergence condition, outputting the trained machine learning model.

16. The method of claim 15, wherein the machine learning model comprises a neural network.

\* \* \* \* \*